Figure 1:
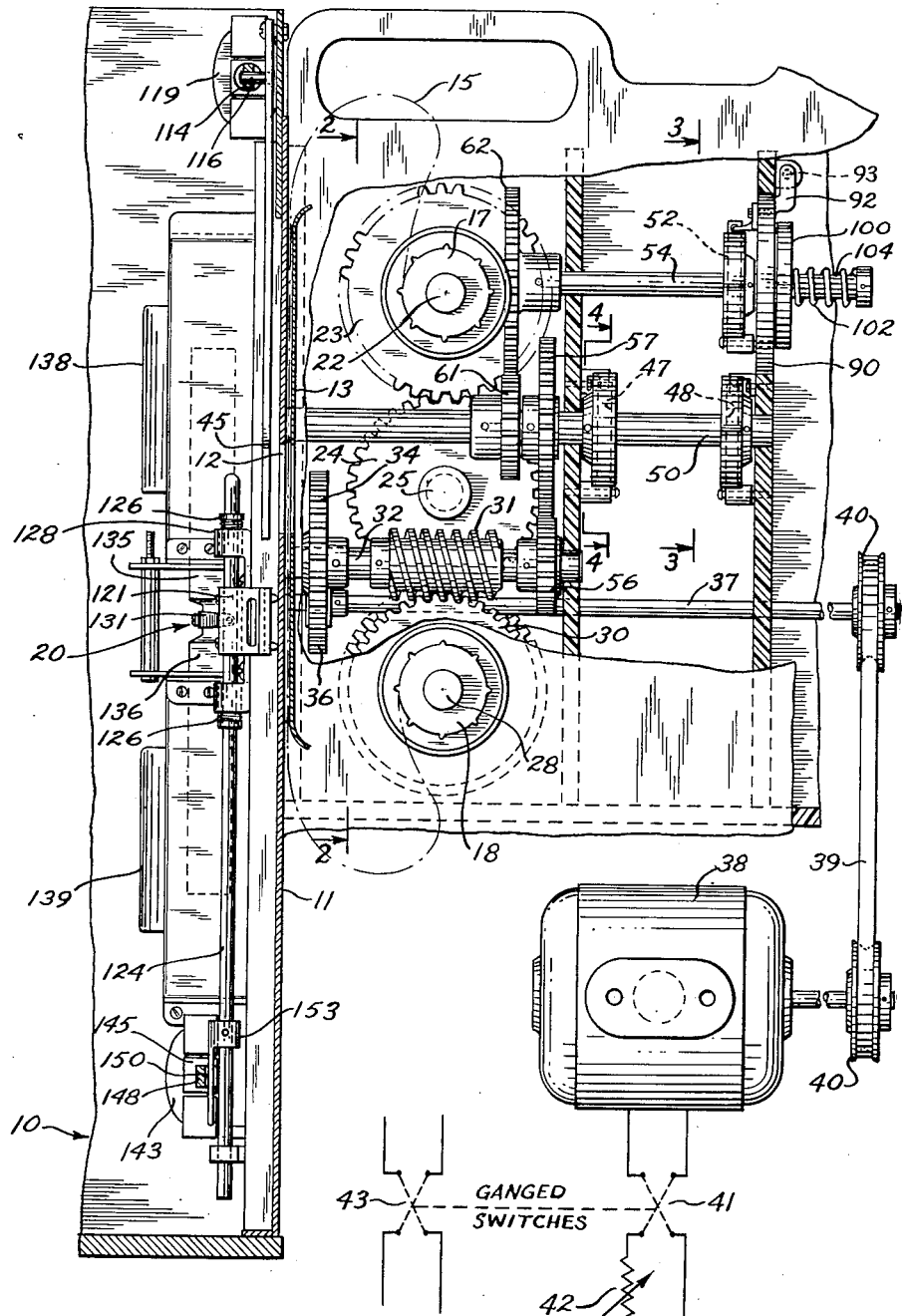

March 11, 1952     J. P. DUBE     2,588,813
MOTION-PICTURE MACHINE WITH ELECTRICALLY
OPERATED SHUTTER AND FILM OPERATOR
Filed Oct. 14, 1948     2 SHEETS—SHEET 1

FIG. I.

March 11, 1952  J. P. DUBE  2,588,813
MOTION-PICTURE MACHINE WITH ELECTRICALLY
OPERATED SHUTTER AND FILM OPERATOR
Filed Oct. 14, 1948  2 SHEETS—SHEET 2
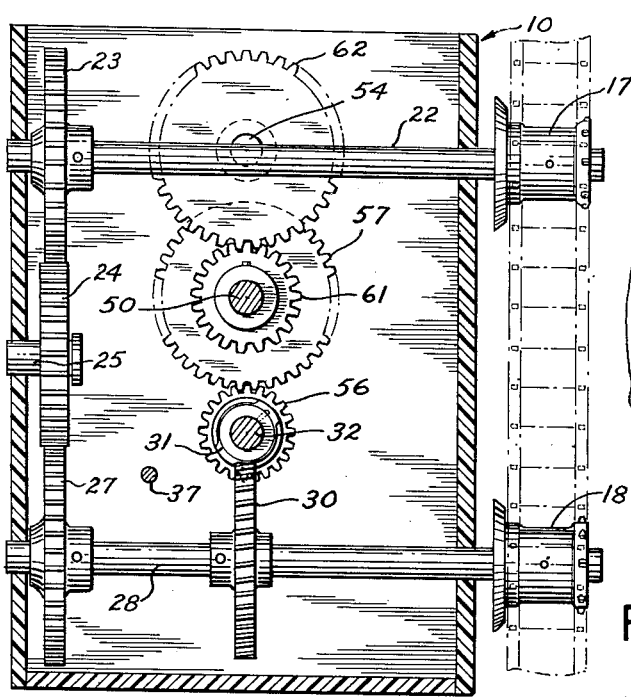
FIG. 2.
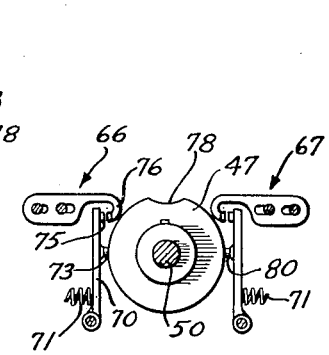
FIG. 3.
FIG. 4.
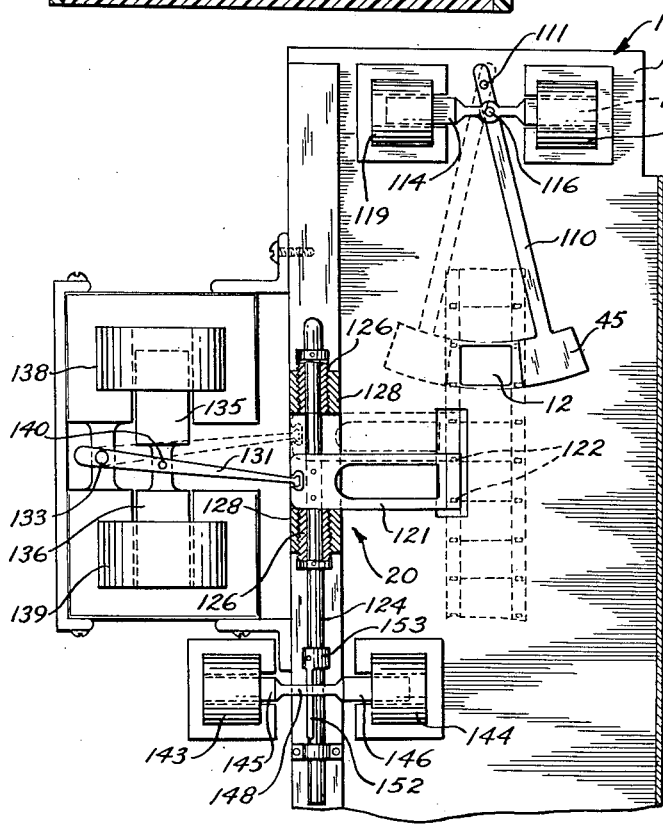
FIG. 5.
INVENTOR
Joseph Paul Dube.
BY
ATTORNEY Patented Mar. 11, 1952

2,588,813

UNITED STATES PATENT OFFICE 2,588,813

MOTION-PICTURE MACHINE WITH ELECTRICALLY OPERATED SHUTTER AND FILM OPERATOR

Joseph Paul Dube, Williamstown, Mass.

Application October 14, 1948, Serial No. 54,512

8 Claims. (Cl. 88—18)

This invention relates to picture projectors which are more flexible than previous projectors, and which can be used for showing individual pictures with manually controlled change from one picture to another, or motion pictures at speeds which vary over a wide range without flicker.

It is an object of the invention to provide an improved picture projector for use with film having motion picture sequences and still pictures photographed on the same reel; and to provide a projector in which the speed of the film through the machine is independent of the shutter speed and independent of the time interval required for moving the film from one picture frame to the next.

One of the advantages of this invention is that motion picture film can be used for visual education without requiring the extensive lengths of film necessary for use with conventional motion picture projectors. Pictures for the study of machinery and production, surgery, military operations, and football or other sports must show action at speeds much less than the speed of actual happenings in order to be of maximum benefit to the persons studying the pictures. With the projector of this invention, pictures taken at speeds of only 16 frames per second can be projected at speeds as low as two frames per second, which is only ⅛ the speed of the actual happening.

The amount of film required at such slow speed is only a fraction of that required where cameras are operated at high speeds in order to obtain slow motion from conventional motion picture projectors. For lecture purposes, the apparatus of this invention can be made to show one picture for as long as the lecturer wants, and changes from one picture to another are under manual control, with the same apparatus that can be used for projecting motion pictures.

Other objects, features, and advantages of the invention will appear or be pointed out as the description proceeds.

Figure 1 is a side elevation, partly in section, showing a motion picture projector embodying this invention, Figures 2, 3 and 4 are sectional views taken on the lines 2—2, 3—3 and 4—4, respectively, of Figure 1, Figure 5 is a front view, on a reduced scale, of the motion picture projector shown in Figure 1.

The motion picture projecting apparatus includes a frame 10 with a vertically extending plate 11 in which there is a film gate 12 through which a light beam passes for projecting an image of a film on a screen in a manner well understood in the motion picture art. A pressure plate 13 holds the film against the back surface of the plate 11 immediately above and below the film gate 12. There is an opening in the pressure plate 13, corresponding with the opening through the film gate 12. The film gate comprises the projection station of the apparatus.

The film, which is shown in dot-and-dash lines and which is indicated by the reference character 15, passes around an upper driving sprocket 17 and a lower driving sprocket 18. These sprockets advance the film to and from the apparatus at a continuous and average rate of speed. The actual intermittent movement of the film, one picture frame at a time past the film gate 12, is effected by claw mechanism indicated generally by the reference character 20.

The sprocket 17 is attached to a shaft 22 which turns in bearings in the main frame 10. The shaft 22 is rotated by a spur gear 23 in mesh with an idler gear 24 on a stud shaft 25 extending from the frame 10. This idler gear 24 is driven by another spur gear 27 secured to a shaft 28 extending parallel with the shaft 22 and similarly journaled in bearings in the frame 10 of the projection apparatus. The lower sprocket 18 is secured to one end of the shaft 28.

The shaft 28 is driven by a worm wheel 30 secured to the shaft 28 and rotated by a worm 31 on a jack shaft 32 which is supported at opposite ends by bearings in transverse walls of the main frame 10. A spur gear 34, secured to the jack shaft 32, meshes with a driving gear 36 on a shaft 37 operated by an electric motor 38 through a belt 39 running on pulleys 40 that are connected with the shaft 37 and the armature shaft of the motor 38. This motor 38 is shown with an adjustable rheostat 42 for changing its speed to control the rate of rotation of the sprockets 17 and 18, and this motor is merely representative of variable speed power means. In addition to the sprockets 17 and 18, the motor 38 operates cams for opening and closing switches that control a shutter 45 and the claw mechanism 20. There are three such cams including two cams 47 and 48 secured to a shaft 50; and a third cam 52 secured to a shaft 54.

These cam shafts 50 and 54 turn in bearings in transverse walls of the main frame 10; and the shaft 50 is driven from the jack shaft 32 through spur gears 56 and 57 secured to the shafts 32 and 50, respectively. The shaft 54 is driven from the cam shaft 50 through spur gears 61 and 62 secured to the shafts 50 and 54, respectively. The gear sizes are so related that the shaft 54 rotates at one-half the speed of the shaft 50 and the shaft 50 preferably makes one revolution for each cycle of operation of the projection apparatus; though it will be evident that the cam shafts could make any multiple or fraction of a revolution for each cycle if the cams 47, 48 and 52 were designed for such operation.

Figures 3 and 4 show the switches that are operated by the cams 47, 48 and 52. The cam 47 rotates between two switches 66 and 67. The switch 66 has an arm 70 supported by a pivot 71 from the main frame of the machine and urged toward the cam 47 by a spring 72. A cam follower 73, made of electrically insulating material and connected to the arm 70, rides on the peripheral surface of the cam 47. A movable switch contact 75, carried on the upper end of the arm 70, touches a fixed switch contact 76 whenever the cam follower 73 moves into a depression 78 in the face of the cam 47. This depression 78 has an angular extent of the order of 40 degrees, and after making allowance for the slope at the opposite ends of the depression, the cam 47 causes the switch contacts 75 and 76 to touch each other during something less than 40 degrees of each revolution of the cam 47.

The switch 67 is similar in construction to the switch 66 and has a cam follower 80 which touches the peripheral surface of the cam 47 at a region which is angularly spaced from the cam follower 73 by approximately 180 degrees. The switches 66 and 67 supply power for operating the claw mechanism to move the film for a distance equal to one picture frame of the film.

The cam 48 operates switches 83 and 84 which are similar in construction to the switches 66 and 67. However, the cam 48 is shaped so that 180 degrees of its peripheral surface has a radius sufficient to hold the switches 83 and 84 open, whereas the remaining angular extent of the peripheral surface of the cam is of small enough radius to permit the switches 83 and 84 to close. The high and low parts of the cam 48 are connected by sloping transition portions of the cam, and substantially one-half of each transition portion can be considered as belonging to the part of the cam that maintains the switches 83 and 84 open, and the other one-half of each transition portion as belonging to the part of the cam that permits the switches 86 and 87 to close.

The shutter operating cam 52 on the shaft 54 is between two switches 86 and 87. These switches are connected to an insulating disc 90 held in a transverse wall of the frame 10, and the switch assembly comprising the disc 91 and the switches 86 and 87 is capable of rotary movement in the frame 10 about the axis of the shaft 54. Such rotary movement of the switch assembly is restricted by a tab 92 which extends rearwardly and upwardly from the disc 90 between two adjustable abutments 93 and 94. These abutments are screws threaded through lugs on the back wall of the frame 10 and provided with lock nuts for holding the screws in adjusted positions.

The adjustable abutments 93 and 94 are spaced far enough to allow an angular movement of the order of 20 degrees for the disc 90, and such angular movement shifts the cam followers of the movable arms of the switches 86 and 87 through the same angles as the disc 90 is rotated and causes the switches 86 and 87 to open and close at different phase angle positions of the cam 52. Since this cam 52 rotates at only one-half of the speed of the cams 47 and 48, a change in phase angle of 20% in the operation of the switches 86 and 87 corresponds with angular movement of 40 degrees for the cams 47 and 48.

The switches 83 and 84 operate the claw mechanism 20 to move the claw mechanism into and out of engagement with the sprocket openings of the film in a way which will be explained more fully in connection with Figure 5. The switches 86 and 87 operate the shutter 45. The connections of the switches 83 and 84 with the claw mechanism can be reversed by means of the reversing switch 43 and must necessarily be reversed whenever the machine is reversed. This is done automatically by having the switch 43 ganged with the reversing switch 41 of the motor 38, as indicated in Figure 1.

The reason that it is necessary to reverse the connections of the switches 83 and 84 (Fig. 3) is because the closing of one switch causes the claw mechanism to engage with the film whereas the closing of the other switch causes the claw mechanism to disengage from the film. When the apparatus is operating in one direction it is necessary to have the claw mechanism engaged with the film while pulling downward, but when the apparatus is operating in the other direction it is necessary to have the claw mechanism engaged with the film when the claw mechanism is moving upward.

The reason for mounting the switches 86 and 87 on a rotatable disc 90 is to provide an adjustment for the timing of the shutter with respect to the operation of the claw mechanism. When the machine is operating in one direction, the tab 92 rests against the abutment 93, and this abutment is adjusted to make the switch 86 swing the shutter across the film gate at the time that the claw mechanism is moving the film from one picture frame to the next. When the machine is operating in a reverse direction, the tab 92 rests against the abutment 94, and this abutment is adjusted to synchronize the operation of the shutter with the movement of the film by the claw mechanism.

The tab 92 is automatically shifted from the abutment 93 to the abutment 94, and vice versa, whenever the direction of movement of the machine is reversed. This is accomplished by means of a friction clutch comprising a disc 100 (Fig. 1) which is slidable on the shaft 54 and which is held in friction contact with the back of the disc 90 by a spring 102. There is a key 104 in the shaft 54 and extending through the disc 100 for causing the disc 100 to rotate as a unit with the shaft 54 while leaving the disc free to move axially on the shaft 54.

Whenever the shaft 54 rotates, the clutch disc 100 causes the switch disc 90 to turn in the same direction as the shaft 54 until the tab 92 strikes against the abutment 93, or the corresponding abutment on the other side, depending upon the direction or rotation of the shaft.

Figure 5 shows the shutter 45 attached to the lower end of an arm 110 which swings about a fulcrum pivot 111 extending from the upper part of the main frame 10. Two solenoid plungers 113 and 114 are connected together and are connected with the arm 110 by a pin 116, this connection having sufficient play to allow for the fact that the arm 110 swings about a center 111 while the plungers 113 and 114 move in a straight line.

The plunger 113 slides in a solenoid 118, and the plunger 114 slides in a solenoid 119. Both of these solenoids are supported on the frame 10. When the solenoid 118 is energized, it pulls the shutter 45 to the right, as shown in Figure 5. When the solenoid 119 is energized, it pulls the shutter 45 to the left and into the dotted line position indicated. As the shutter 45 swings from its full line to its dotted line position, it passes across the film gate 12 and cuts off the light beam by which the film is projected. It will be apparent that the shutter operating motor means, comprising the solenoids 118 and 119, move the shutter at a speed independent of the speed at which the sprocket driving motor of the machine is running; and the length of time that the film gate 12 is covered depends upon the speed of operation of the shutter operating solenoids and the width of the shutter 45, particularly its width in excess of the width of the film gate 12. The speed of operation and the width of the shutter are correlated to produce only a momentary interruption in the light, and this interruption is of such short duration that it is not apparent to an observer.

Since the solenoids 118 and 119 are energized by the switches 86 and 87, each of which is closed for a half-turn of the cam shaft 54 and a full-turn of the cam shaft 50, the shutter 45 swings across the film gate toward the right after one movement of the film and toward the left after the next movement of the film. Thus the cycle of operation of the shutter 45 is twice as long as the cycle of operation of the claw mechanism that moves the film.

Figure 5 shows also the claw mechanism 20 which comprises a claw plate 121 with claws 122 at one end. The other end of the claw plate 122 is pinned to a shaft 124 which slides up-and-down in bushings 126. These bushings 126 are threaded through lugs 128 extending from the frame of the machine. The confronting ends of the bushings 126 comprise abutments for limiting vertical movement of the claw plate 121. By screwing the bushings 126 in directions to bring them closer together, the stroke of the claw plate 121 and shaft 124 can be changed, and the position of the claw plate at the ends of its stroke can be varied to properly center the film frame in the film gate.

The claw plate 121 is moved up-and-down by an arm 131 which swings about a fulcrum pivot 133 on the frame of the machine. The arm 131 is connected with the claw plate 121 by a universal connection that allows for a limited angular movement of the claw plate 121 about the axis of the shaft 124 so that the claws 122 can be moved into and out of engagement with the sprocket teeth openings of the film without interfering with the connection between the claw plate 121 and its operating arm 131.

Upper and lower solenoid plungers 135 and 136, respectively, are connected together and slide vertically in solenoids 138 and 139, respectively. These solenoid plungers 135 and 136 are connected with the arm 131 by a pin connection 140 which is loose enough to compensate for the angular movement of the arm 131 and the straight line movement of the plungers 135 and 136.

When the solenoid 138 is energized, it moves the claw plate 121 upward from the full line position shown in Figure 5 to the dotted line position shown. When the solenoid 139 is energized, it pulls the claw plate 121 downward. Whether the upward or the downward movement of the claw plate 12 brings the next frame into position for projection depends upon whether the claws 122 are moved into engagement with the sprocket openings of the film before the upward movement or the downward movement of the claw plate.

The shaft 124 can be turned angularly, to engage and disengage the claws 122 and the sprocket opening of the film, by solenoids 143 and 144. These solenoids 143 and 144 operate plungers 145 and 146, respectively. A connector 148 between the plungers 145 and 146, has a notch 150, best shown in Figure 1, which straddles a key 152 extending downward from a collar 153 that is rigidly pinned to the shaft 124.

Movement of the connector 148 by the solenoid plungers 145 and 146 causes the opposite ends of the notch 150 to engage the key 152, depending upon the direction of movement of the connector 148, and turn the shaft 124 angularly about its axis. When the solenoid 143 is energized, the connector 148 is pulled to the left-hand end of its stroke, and the key 152 is moved into position to rock the shaft 124 in the direction that holds the claws 122 clear of the sprocket openings in the film. When the solenoid 146 is energized, the connector 148 moves the key 152 in the direction that swings the shaft 124 into position to cause the claws 122 to engage the sprocket openings in the film.

In the operation of the machine, the solenoids 118 and 119 are energized successively to operate the shutter 45, energy to the solenoids being supplied by the closing of the switches 86 and 87 (Fig. 3) on the switch disc 90. The claw plate 121 (Fig. 5) is moved up-and-down, by the solenoids 138 and 139 which are supplied with energy successively through the switches 83 and 84 (Fig. 3). The solenoids 143 and 144 (Fig. 5) which shift the claw mechanism into and out of engagement with the sprocket openings of the film are supplied with energy through the switches 66 and 67 (Fig. 4).

It will be apparent from the foregoing description that the shutter 45 and the claw plate 121 are operated by electric motor means which operate independently of the motor that drives the sprockets for the film. Although the operation of the solenoid motor means is independent of the sprocket motor in speed of operation, the frequency of the operation of the solenoid motor means is under control of the sprocket driving motor because the cam shafts which operate the switches for the solenoids are driven for the same motor that drives the film sprockets.

This independent operation of the motor means for the shutter and the claw mechanism is important because the shutter operates just as fast when the sprocket motor is running slowly, or even if the sprocket motor is temporarily stopped while displaying still images and then moved at slow and irregular speed in order to bring about the operation of the shutter and claw mechanism to move the film and display the next picture.

The expression "claw mechanism" is used in the description and claims to denote apparatus that moves film intermittently for a distance equal to the length of a film frame. Mechanical devices for this purpose, differing from that illustrated, may be equivalents in certain combinations defined in the claims. Likewise, motor means other than solenoids can be used in some of the combinations, and feed rollers having no teeth may be mechanically equivalents of the sprockets for some embodiments of the invention.

Various changes and modifications can be made in the preferred embodiment which has been illustrated and described, and some features of the invention can be used alone or in different combinations without departing from the invention as defined in the claims.

What is claimed is:

1. Apparatus for projecting images from motion picture film, including a projection station, sprockets on both sides of the projection station for advancing the film through the apparatus, variable speed driving means connected with the sprockets, means for projecting a beam of light through the film at the projection station, a plate shutter at the projection station, a support on which the shutter oscillates back and forth across the light beam, mechanism that operates the shutter in each direction across the light beam at speeds independent of the speed of the sprockets and their driving means, and connections between the driving means and the shutter operating mechanism for controlling the frequency of operation of the shutter, said connections including means that moves the shutter in opposite directions for successive exposures of the apparatus.

2. Picture projecting apparatus comprising a projection station, means for projecting a beam of light through the film at the projection station, a plate shutter at the projection station, a support on which said plate shutter oscillates back and forth across the light beam electric motor means that move the shutter across the light beam in one direction to terminate one exposure period and across the light beam in the opposite direction to terminate the next successive exposure period, electric switch means that controls the supply of power to said electric motor means, sprockets for advancing a film strip toward and from the projection station, power driving means for the sprockets including another electric motor means, a device that advances the film strip one film frame at a time past the projection station, a controller for said device operated by said other electric motor means, another controller for adjusting the speed of said other electric motor means, and connections between the power driving means and the electric switch for operating said electric switch, means to control the supply of power to the electric motor means to move the shutter and terminate exposure periods in timed relation with the operation of the device that advances the film strip one frame at a time.

3. Picture projecting apparatus comprising a projection station, claw mechanism movable into position to engage with sprocket openings in a film and movable in the direction of the film to bring the next picture frame of the film into position at the projection station, solenoid means for moving the claw mechanism to engage the film, other solenoid means for moving the claw mechanism to advance the film, a switch for controlling the supply power to the first solenoid means, another switch for controlling the supply of power to said other solenoid means, sprockets for advancing the film through the apparatus, driving means for the sprockets mechanically independent of said solenoid means, and motion transmitting connections between the sprocket driving means and the switches including devices for closing said switches in timed relation with one another.

4. A picture projector, including in combination, a projection station, a shutter at the projection station movable transversely across a beam of light that projects images of the film at the projection station, two solenoids connected with the shutter and operable to move the shutter in opposite directions transversely of said projection station, claw mechanism movable about a pivot into and out of engagement with sprocket openings of the film, two solenoids connected with the claw mechanism and operable to swing the claw mechanism in opposite directions about its pivot, apparatus for moving the claw mechanism longitudinally of the film strip to advance the film and bring the next picture frame into position at the projection station, said apparatus including two solenoids that move the claw mechanism in opposite directions axially of the pivot about which the claw mechanism swings, sprockets for advancing the film through the projector, a continuously operating motor driving the sprockets, a speed control device for said motor, switches that supply power to the solenoids, and separate cams driven from the sprocket driving motor and having contours in such phase relation to one another that the cams operate the switches in timed relation and produce a predetermined sequence of operation of the solenoids of the shutter and claw mechanism.

5. A motion picture projector including a projection station, sprockets ahead of and beyond the projection station for feeding a film through the projector, reversible motor means for operating the sprockets either forwardly or rearwardly, a shutter, a claw for moving the film intermittently at the projection station, operating mechanism for the shutter and claw, and control apparatus for changing the sequence of operation of at least a portion of the operating mechanism for the shutter and claw when the direction of movement of the film through the projector is reversed, said control apparatus including two switch operators, both of which are driven from the reversible motor means and one of which includes a lost motion connection through which it is driven from said motor means, and a friction clutch that causes the lost motion to be taken up in different direction when the motor means is reversed, said lost motion being of sufficient extent to change the sequence in which the switch operators actuate their switches.

6. A moving picture projector including sprockets for moving the film through the projector, a projection station, mechanism for intermittently moving the film to bring successive film frames into position at the projection station, a shutter, motor means for operating the shutter, a cam operated from the film moving mechanism, said cam being rotatable about an axis and through a cycle, a switch assembly operated by the cam during its rotation for energizing the motor means of the shutter, means for reversing the direction of operation of the sprockets, and control means that change the phase angle position of the switch assembly with respect to the cam to shift the time of operation of the shutter in the cam cycle when the film driving sprockets are reversed.

7. The motion picture projector defined in claim 6 and in which the switch operating cam is driven from the same power means that operate the film sprockets, and in which a friction clutch is interposed between the cam shaft and a portion of the switch assembly for shifting the position of the switch assembly automatically upon the reversal of the direction of rotation of the cam shaft.

8. A projector for motion picture film, said projector including sprockets for moving the film through the machine, power operating mechanism for the sprockets, a device for reversing the operation of the power operating mechanism, claw mechanism for moving the film, said claw mechanism including motor means for causing the claw mechanism to engage and disengage with sprocket openings in the film, other motor means for causing the claw mechanism to move up-and-down in the direction of the intended film travel, switch means operated in timed relation with the power operating mechanism for the sprockets for energizing the motor means of the claw mechanism, and a reversing switch, for one of the motor means of the claw mechanism, mechanically connected with the reversing device of the sprocket operating mechanism so that the reversal of the direction of rotation of the sprockets automatically changes the relation of operation of the motor means of the claw mechanism and cause the claw mechanism to be in engagement with the film when moving in the direction that the film is advanced by the sprockets.

JOSEPH PAUL DUBE.

REFERENCES CITED

The following references are of record in the file of this patent:

UNITED STATES PATENTS

| Number | Name | Date |
|---|---|---|
| 1,277,195 | Connor et al. | Aug. 27, 1918 |
| 1,315,224 | Hill | Sept. 9, 1919 |
| 1,683,303 | Riddell | Sept. 4, 1928 |
| 1,734,221 | Markham | Nov. 5, 1929 |
| 1,983,898 | Cole | Dec. 11, 1934 |
| 2,082,074 | Moomaw | June 1, 1937 |
| 2,091,508 | Howell | Aug. 31, 1937 |
| 2,141,037 | Franklin | Dec. 20, 1938 |
| 2,160,390 | Pfannenstiehl | May 30, 1939 |
| 2,371,836 | Masterson | Mar. 20, 1945 |
| 2,409,834 | Clapp | Oct. 22, 1946 |

FOREIGN PATENTS

| Number | Country | Date |
|---|---|---|
| 420,302 | Germany | Oct. 21, 1925 |